Oct. 31, 1967  E. J. WEBB  3,349,675
TRANSVERSE JOINT ASSEMBLY FOR CONCRETE PAVEMENTS
Filed July 30, 1965  6 Sheets-Sheet 1

INVENTOR
ELMER J. WEBB
BY
Kane, Dalsimer & Kane
ATTORNEYS

Oct. 31, 1967 E. J. WEBB 3,349,675
TRANSVERSE JOINT ASSEMBLY FOR CONCRETE PAVEMENTS
Filed July 30, 1965 6 Sheets-Sheet 2

INVENTOR
ELMER J. WEBB
BY
Kane, Dalsimer & Kane
ATTORNEYS

Oct. 31, 1967  E. J. WEBB  3,349,675
TRANSVERSE JOINT ASSEMBLY FOR CONCRETE PAVEMENTS
Filed July 30, 1965  6 Sheets-Sheet 3
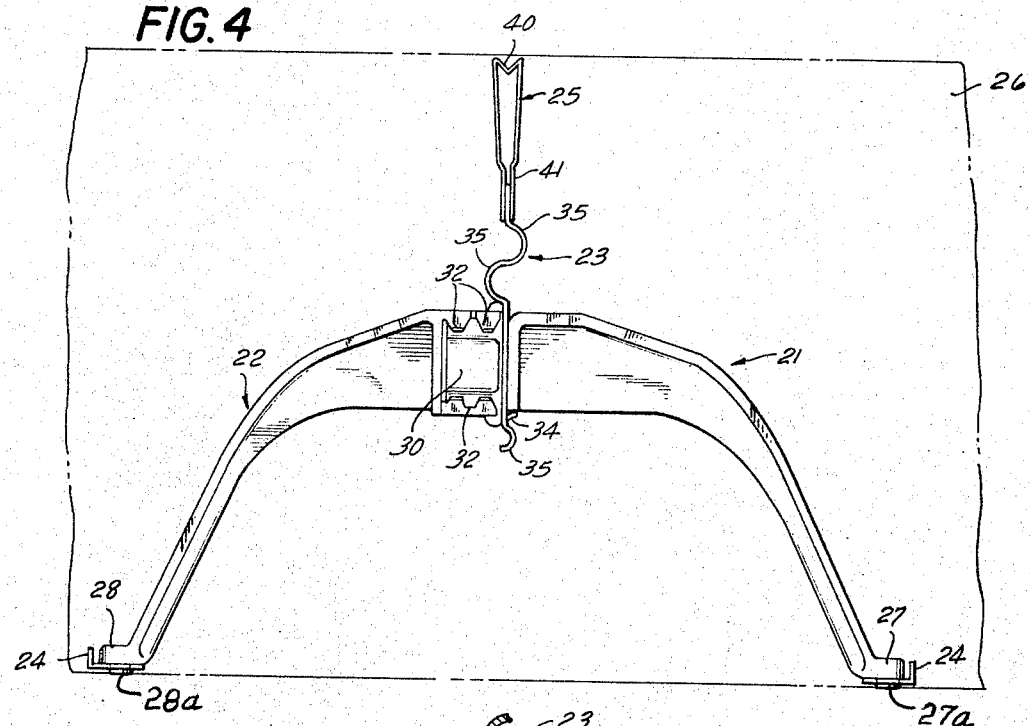
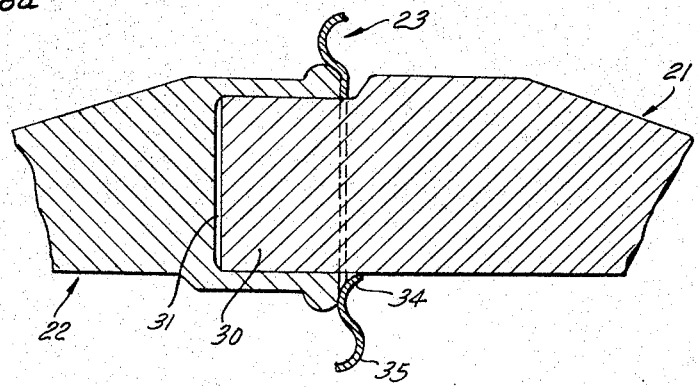
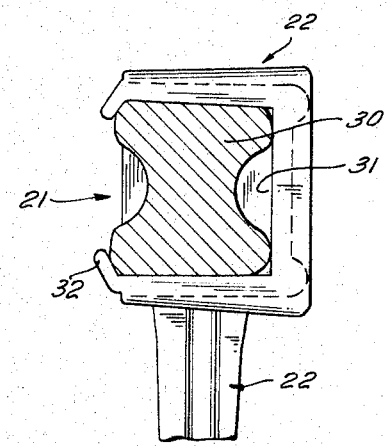
INVENTOR
ELMER J. WEBB
BY
Kane, Dalsimer & Kane
ATTORNEYS

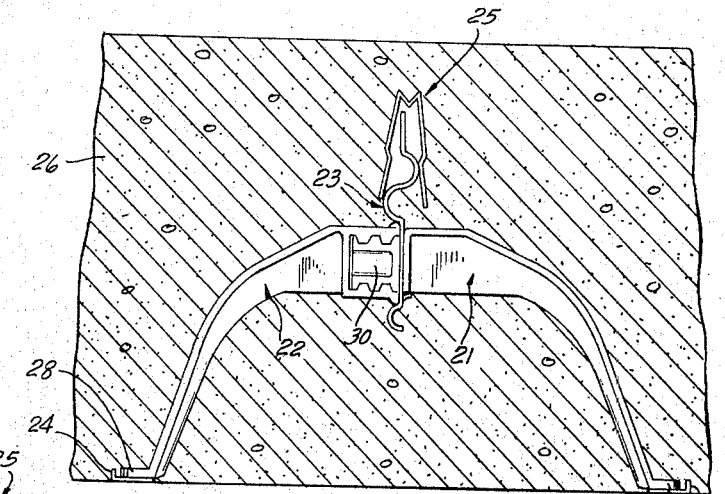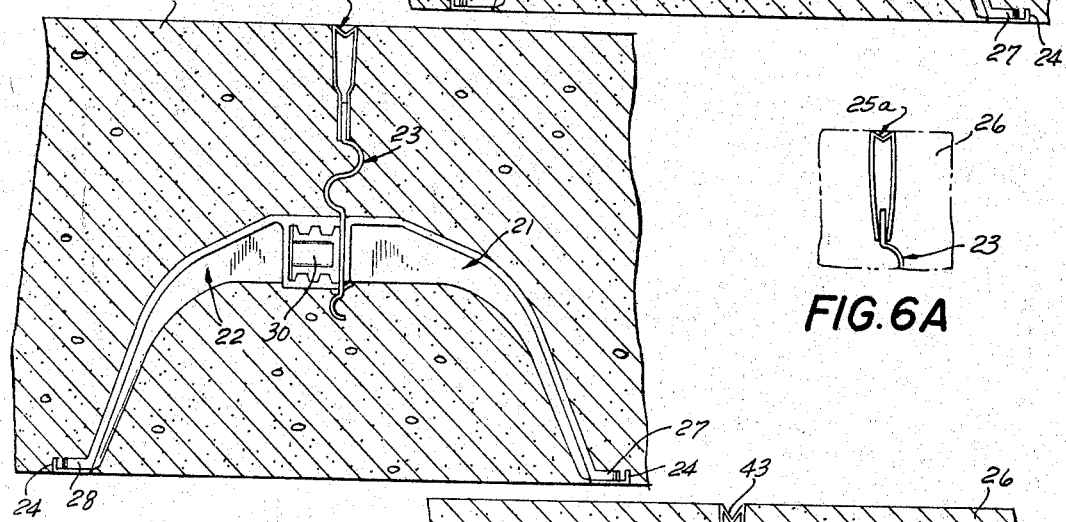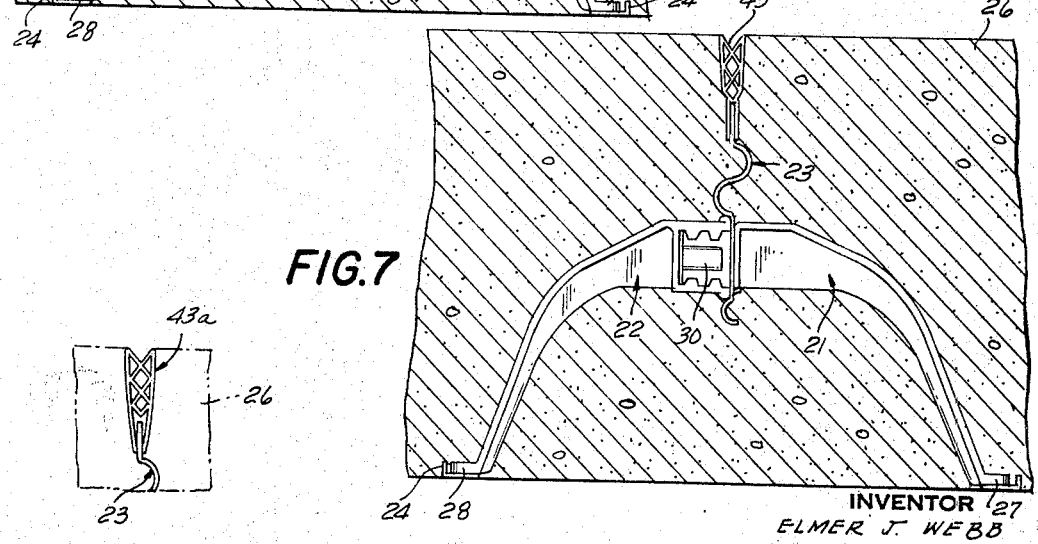

Oct. 31, 1967     E. J. WEBB     3,349,675
TRANSVERSE JOINT ASSEMBLY FOR CONCRETE PAVEMENTS
Filed July 30, 1965     6 Sheets-Sheet 5

INVENTOR
ELMER J. WEBB
BY
Kane, Dalsimer + Kane
ATTORNEYS

Oct. 31, 1967     E. J. WEBB     3,349,675
TRANSVERSE JOINT ASSEMBLY FOR CONCRETE PAVEMENTS
Filed July 30, 1965     6 Sheets-Sheet 6

INVENTOR
ELMER J. WEBB
BY
Kane, Dalsimer + Kane
ATTORNEYS

United States Patent Office 3,349,675
Patented Oct. 31, 1967

3,349,675
TRANSVERSE JOINT ASSEMBLY FOR CONCRETE PAVEMENTS
Elmer J. Webb, Syracuse, N.Y., assignor to The Brewer-Fitchener Corporation, Cortland, N.Y., a corporation of New York
Filed July 30, 1965, Ser. No. 475,945
6 Claims. (Cl. 94—8)

ABSTRACT OF THE DISCLOSURE

A joint assembly for creating a plane of weakness thereby to controllably locate in an otherwise continuous elongated concrete pouring a joint to accommodate upon thermal changes contractions and expansions of the concrete. The assembly includes a pair of supporting arms interconnected at one end and mounting at the connection a vertical plate which defines said plane of weakness when a concrete strip is poured over and around the joint assembly.

---

This invention relates to an improved transverse concrete joint assembly and to the method of making the same.

Concrete highways are generally formed in continuous elongated strips and in order to control the otherwise random formation of cracks, transverse joints are formed therein at predetermined intervals, thereby providing for contraction and expansion in response to shrinkage and thermal changes. The transverse joints have generally been made by forming a recess or groove across the upper portion of the concrete strip or slab either before or after it has taken an initial set and permitting a transverse crack to form from the base of the recess to the lower surface of the concrete upon contraction. The formation of the crack can be further facilitated and controlled by providing a plane of weakness in the concrete slab beneath the recess in the form of a plate supported in a vertical plane and extending transversely across the concrete strip at the point where the joint is to be formed. After the recess has been formed across the upper portion of the concrete strip it is filled with a sealing strip either formed in situ from pitch or composition material or preformed from neoprene or a composition material and inserted into the recess some time after it has been formed.

Considerable difficulty has been occasioned by the transverse joints. Thus, seepage of water into the joint and alternate freezing and thawing has resulted in damage to the filler strip and to the concrete at the confronting faces at the ends of the slab sections and this condition has been aggravated by the use of antifreezing and thawing preparations such as calcium chloride, and by the deposition of other corrosive materials on the concrete. Sealing difficulty frequently results from the accumulation of foreign matter and dirt on the surfaces of the recess after it has been formed and before the sealing strip is inserted therein—thus preventing adhesion between the surfaces and the strip. Further difficulty has been occasioned by relative vertical movement or flexing of the slab ends resulting from changes in loading of the ends as the wheels of a vehicle roll over the joint. Repeated flexing of the slab ends, even for so small a distance as 1/16 inch ultimately will break down the slab at the neutral point of the cantilever action.

Attempts to solve this problem have not been altogether satisfactory. Thus, attempts to improve the structure and material of the sealing strips have not prevented contamination and the accumulation of dirt in the recess prior to the insertion of the sealing strip, nor have they solved the problem of adhesion or sealing between the strip and the concrete. Furthermore, the joint supports heretofore provided have permitted vertical flexing of the ends of the slabs in excess of 1/16 inch or have set up excessive stresses within the concrete resulting in damage to the concrete.

It is a prime object of the present invention to overcome the difficulties and disadvantages heretofore encountered in connection with transverse joint of concrete pavements and to provide an improved transverse concrete joint assembly and method of making the same, whereby the recess may be formed and sealed in a manner to minimize contamination and the accumulation of foreign matter and dirt in the recess and so as to insure sealing of the recess against leakage; which provides for contraction and expansion while preventing or minimizing excessive and harmful flexing or vertical shifting of the ends of the slabs; and which, while vertically stabilizing the ends of the slabs, avoids excessive internal stresses in the concrete slab.

A further object is the provision of an improved transverse concrete joint assembly in which the recess is made in an improved manner so that the sealing strip is directly and mechanically sealed thereto.

My invention contemplates the provision of an improved transverse concrete joint assembly having improved complementary joint supports embedded in the ends of the concrete slabs at the joint and having telescopic engagement with each other to permit relative longitudinal shifting. The supports provide efficient load transmission across the joint while at the same time permitting longitudinal contraction and expansion of the concrete slabs because of the telescopic connection between the supports. The supports are preferably tapered in proportion to the stresses developed in the concrete from the loads imposed on the supports. Thus, balance is created between the high strength of the support and the lower strength of the concrete. A center foundation plate extending across the slab at the joint serves to hold and control the supports in accurately arranged relationship during handling, shipping and installation. It also provides a plane of weakening to help control the location of the crack.

In preferred embodiments of the invention, either a temporary or permanent seal is supported on the center plate so that it can be retracted downwardly while the concrete strip is laid or formed in superposed relationship to the strip. Then, while the concrete is still wet, the sealing strip is elevated to the surface of the concrete thereby forming a recess in alignment with the plane of weakness provided by the center plate and along which the crack will form. Since the recess is formed in the fresh concrete prior to initial setting, the concrete conforms with the contour of the sealing strip and is mechanically sealed thereto. Thus, the recess and joint are sealed and protected. If the sealing strip is only a temporary one it protects the recess and the edges thereof against contamination and the accumulation of dirt prior to the installation of the permanent seal. The temporary seal can, in due course, be removed and the permanent seal immediately inserted in its place. If the initial sealing strip is a permanent one, it can be left in place after it has been elevated to form a recess and it will remain in sealing relationship with the adjacent concrete edges.

In the accompanying drawings:

FIG. 1a is a fragmentary elevational view showing the assembly of the joint supports through the operation of a press shown in phantom prior to the assembly of these supports with the center foundation plate;

FIG. 4 is a cross sectional view of the joint assembly in the direction of the arrows on the line 4—4 of FIG. 3;

FIG. 4a is a detailed sectional view in the direction of the arrows on the line 4a—4a of FIG. 2;

FIG. 4b is a detailed cross sectional view through the telescopic fastenings of the joint supports in the direction of the arrows on the line 4b—4b of FIG. 2;

FIG. 5 is a view similar to FIG. 4 showing the temporary sealing strip or forming cap in vertically retracted position and showing the arrangement of the parts immediately after the concrete has been poured and prior to taking an initial set;

FIG. 6 is a view similar to FIG. 5 but showing the forming cap or temporary seal in elevated position so as to form the recess;

FIG. 6a is a fragmentary view similar to FIG. 6 showing a modified form of cap;

FIG. 7 is a view similar to FIG. 6 but showing a permanent seal inserted in place of the temporary seal;

FIG. 7a is a fragmentary view somewhat similar to FIG. 7 showing a modified form of permanent seal inserted in place of the temporary seal of FIG. 6a;

Figure 1:
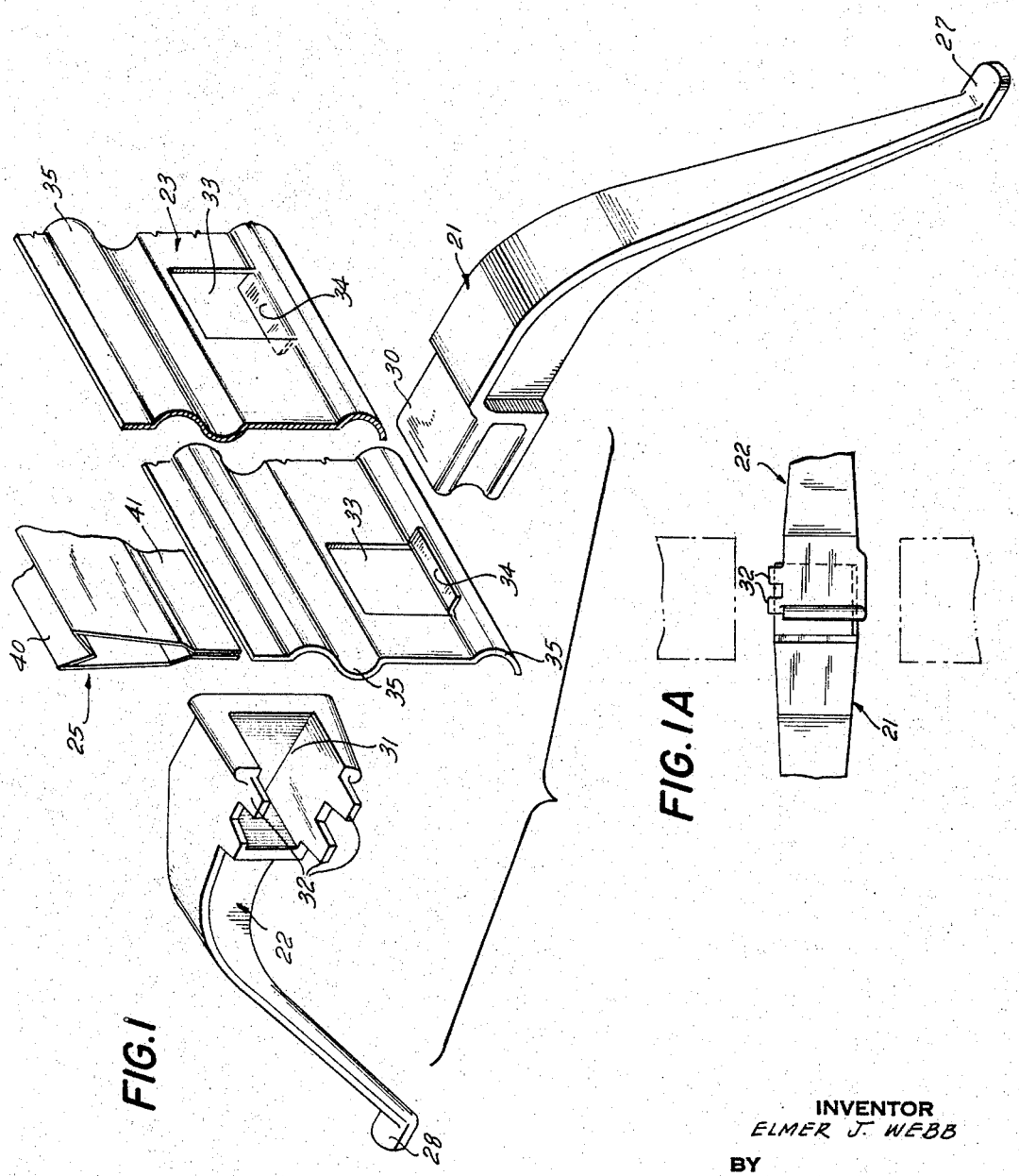
FIG. 1 is an exploded view, partially fragmentary and partially sectional, showing a pair of joint supports, the center foundation plate and one form of plastic forming cap and temporary sealing strip prior to assembly.

Referring to the accompanying drawings, my improved transverse concrete joint assembly consists of a plurality of pairs of joint supports 21 and 22, a center foundation plate 23 and a pair of spacer bars 24. The assembly may also include a recess forming and sealing strip as shown at 25 or as shown in various modified forms at 25' to 25⁷ in FIGS. 8 to 20, inclusive. The transverse concrete joint assembly is pre-assembled and is installed transversely of the road bed at the intended location of the transverse joint in the concrete strip to be poured and laid on the road bed. It will be appreciated that one of the joint assemblies is located at each of the transverse joint positions.

The concrete strip is indicated at 26 in each of FIGS. 4, 5, 6 and 7.

The joint supports 21 and 22 are in the form of male and female load supporting arms which have telescopic engagement with each other so as to provide for relative longitudinal adjusting and shifting to permit contraction and expansion of the concrete slabs. They are made from a suitable metal having sufficient strength and rigidity to give the desired support to the joint and to prevent excessive and harmful flexing or vertical shifting of the ends of the adjacent concrete slabs. For this purpose malleable iron serves very satisfactorily. To impart the desired strength and rigidity thereto, the arms are preferably T-shaped in cross section as shown. They extend downwardly at an angle and terminate in foot supports or rests 27 and 28 which engage with the spacer bars 24. To facilitate the connection with the spacer bars, the foot rests of the supporting arms may be provided with downwardly extending projections which engage with and may be riveted to apertures formed in the spacer bars. The support arms may, of course, be connected to the spacer bars 24 in another suitable manner as by welding. The supporting arms, in addition to extending downwardly at an angle, also are of tapered construction, tapering from the upper end thereof to the foot rests and the taper is preferably in proportion to the stresses developed in the concrete from the loads imposed on the supports. In this fashion a balance is achieved between the high strength of the supporting arms and the lower strength of the concrete.

As previously indicated, the supporting arms 21 and 22 are arranged in pairs and they have telescopic interengagement with each other. Thus, supporting arm 21 has a projecting fastening portion 30 and supporting arm 22 has a socket-like fastening portions 31 with which the projecting portion 30 has sliding engagement. The socket portion 31 is preferably open on one side and has projecting tabs 32 which, upon assembly of the parts, are folded against the projecting portion 30 to provide a tight sliding fit between the parts.

The center foundation plate 23 is made of a suitable sheet metal, such as steel, and I have found that 14 gauge hot rolled steel serves very satisfactorily for this purpose. The plate should be long enough to extend for the entire width of the concrete slab or strip at the transverse joint. At spaced intervals throughout its length, the plate is formed with openings 33 of a size sufficient to accommodate the passage of supporting arm 21 from its foot rest 27 to the projecting portion 30 forming the fastening member of the male supporting arm 21. At the lower edge of each opening a tab 34 is formed and these are preferably arranged so that adjacent tabs project in opposite directions. To lend longitudinal rigidity to the center plate, I preferably provide it with a plurality of longitudinal corrugations as shown at 35.

In assembling the joint assembly a center foundation plate of the same length as the desired width of the concrete strip or slab is prepared in the manner shown, with corrugations 35 and openings 33 therein. The openings are provided at the desired spacing of the supporting arms and for this purpose I have found that satisfactory results are achieved where the apertures at the two ends of the strips have their centers positioned approximately 5 inches from the end of the center foundation plate and the remaining apertures are positioned at approximately 12 inch centers. As previously explained, the tabs 34 are preferably formed so that adjacent tabs project in opposite directions.

The pair of supporting arms 21 and 22 are initially assembled prior to association with the selected aperture 33 of the center plate 23. This may be advantageously accomplished by means of a press illustrated schematically and in phantom in FIG. 1a. The jaws of the press operate to "coin" or fit in a secure manner the male projecting portion 30 within the female socket portion 31. In this connection, the tabs 32 will be folded into tight engagement with the sides of projecting portion 30, as shown most clearly in FIG. 4b. The foot rest 27 of male arm 21 of the assembled arms will then be inserted through the accommodating aperture 33 so that the socket end (FIG. 4a) engages the center plate 23 to thereby loosely assemble the arms and center foundation plate 23.

Figure 2:
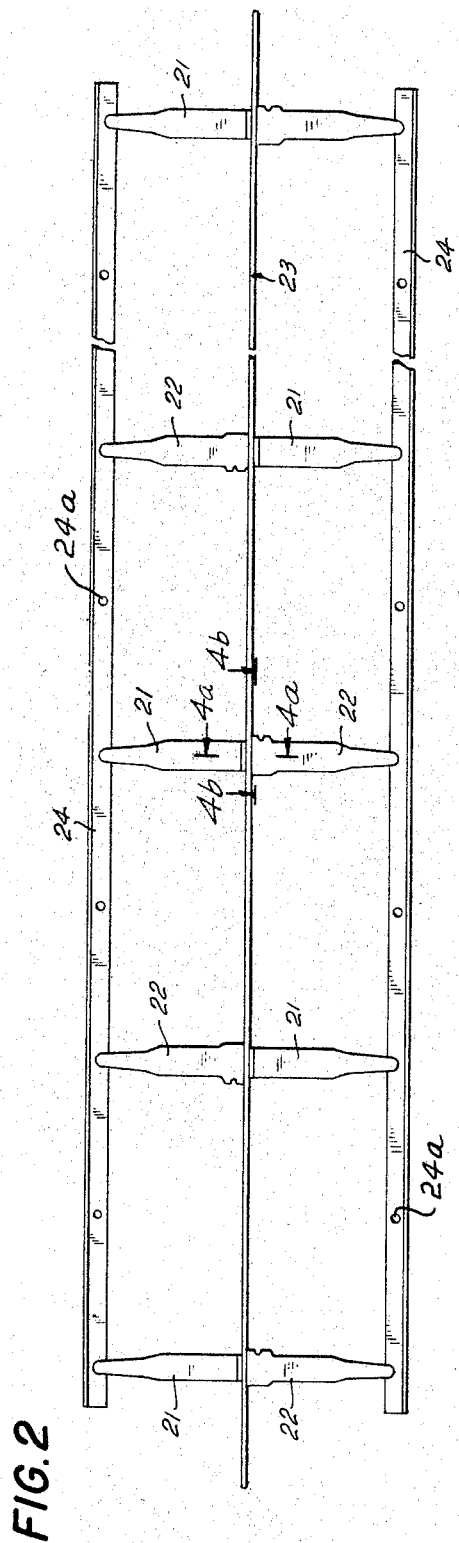
FIG. 2 is a top plan view of a transverse joint assembly in assembled relationship but prior to the pouring of the concrete.
Figure 3:
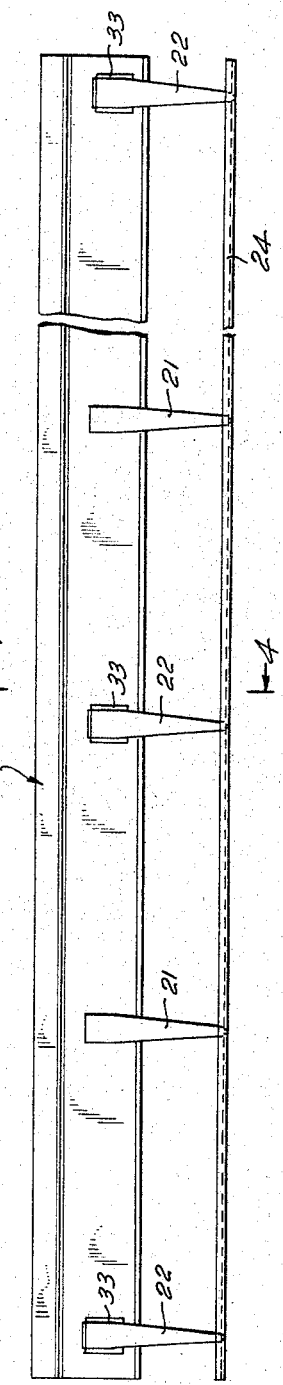
FIG. 3 is a side elevational view of the joint assembly shown in FIG. 2.

As shown in the drawings, particularly in FIGS. 2 and 3, the adjacent pairs of arms 21 and 22 are assembled in opposite relationship with the male arm 21 being located on one side of the center plate in one pair and being located on the opposite side of the center plate in the next adjacent pair. This alternating relationship advantageously balances the looseness, if present, between the assembled arms 21 and 22 and the possible effect this looseness may have on the resultant assembly. A slight looseness will at times be present in order not to build up too much resistance at the connection between the arms 21 and 22 which may operate in resisting opening up the concrete to form the crack in the concrete.

Tab 34 is then folded upwardly into tight engagement with the under surface of the arm 21 as shown most clearly in FIGS. 4 and 4a thereby to reduce the effective size of each opening 33 so as to accommodate the projecting portion 30. When the center plate and supporting arms have been assembled in this fashion, the spacer bars 24 are then assembled with the foot rests 27 and 28 of the arms 21 and 22. As shown in FIG. 4 each foot rest 27 and 28 carries, respectively, a downwardly projecting lug 27a and 28a which are received within and passed through the apertures 24a in bars 24. Assembly may be completed by upsetting, riveting or otherwise mechanically connecting the lugs to the lower surface of the bars thereby creating a unitary structure.

The joint assembly may be pre-assembled in this fashion at a shop or assembly station and then transported to the job or, under certain circumstances, the joint may be assembled in situ. Under any circumstances, when the road bed has been prepared, the joint assemblies are arranged transversely of the road bed at spaced intervals corresponding to the desired spacing between the transverse contraction and expansion joints.

The parts are dimensioned and arranged so that the upper edge of the center plate 23 is supported at a plane beneath the desired plane of the upper surface of the concrete strip or slab. As an example, where it is desired to form a slab having a height of approximately 9 inches, then the upper surface of the center plate 23 should preferably be supported at a height of approximately 6½ to 8 inches. When the joint assemblies have all been properly positioned on the road bed, the concrete is poured in the usual manner so as to extend over the respective joint assemblies with the plane of the upper surface of the concrete strip being an inch or two higher than the plane of the upper surface of the center plates 23.

Thereafter a joint recess is formed transversely of the upper surface of the concrete strip in alignment with the transverse center plate 23 at each of the joint assemblies. This may be accomplished either before or after the concrete has taken an initial set in the usual manner or it may be accomplished by means of my improved recess forming and sealing strip as hereinafter explained. Under any circumstances, the center plate 23 provides a plane of weakness in the concrete strip and in due course, upon contraction, a crack is formed extending downwardly in the plane of the center plate to the lower surface of the concrete strip whereby the concrete strip is formed into separate slabs.

It will be seen that the supporting arms are embedded in the ends of the respective concrete slabs on each joint assembly and that the arms in each pair have telescopic engagement with each other, thereby permitting relative longitudinal shifting. However, due to the interengagement between the projection 30 and socket 31 the supporting arms provide efficient load transmission across the joint. Due to the relatively tight fit between the projection and socket, vertical shifting between the arms is minimized, thereby preventing excessive and harmful flexing of the ends of the adjacent slabs. Thus, the ends of the concrete slabs are stabilized. As previously explained, due to the tapered construction of the arms, a balance is created between the high strength of the support and the lower strength of the concrete, thereby avoiding excessive internal stresses in the concrete slab.

My assembly also preferably includes a recess forming and sealing strip. This may take various different forms, as for instance, the form shown in FIGS. 1, 5 and 6 or any of the forms shown in FIGS. 8 to 20. These strips may be temporary strips which are used to form the recess and then to temporarily seal it, or they may be permanent strips intended to form the recess and to later provide a permanent seal therefor. The form of strip shown in FIGS. 1, 4, 5 and 6 is preferably used as a temporary seal. The strip 25 shown in these figures is preferably formed as by extrusion from a plastic material which will not adversely affect the concrete and which is unaffected by the concrete, hydrocarbon materials and other chemicals which may be deposited on the highway. For this purpose I have found that polyvinyl chloride, polyethylene and polypropylene serve very satisfactorily. The material should be flexible, yielding and resilient, but it should have sufficient rigidity that a concrete slab can be poured over the top thereof and it can then be pulled upwardly through the freshly poured concrete to provide a recess therein. Relatively stiff polyvinyl, polyethylene and polypropylene which is nevertheless flexible, yielding and resilient, serves the desired purpose very satisfactorily. The strip 25 is bifurcated, as shown, having two side portions terminating in an integral top portion 40 which is of V-shape. From the V-shaped top 40 the sides taper downwardly initially, as shown, providing a tapered box-like structure and the lower ends thereof are deformed inwardly, terminating in the approximately positioned clamping portions 41. The normal width of the strip 25 near the upper end thereof should be in excess of the desired width of the recess.

In the initial assembly, the clamping portions 41 are assembled over the center plate 23 and the strip is pressed downwardly to its lowermost position as shown in FIG. 5. In this position the upper portion 40 of the strip is positioned close to the upper edge of the center plate 23. A strip whose length corresponds approximately with the width of the concrete strip is assembled with the center plate as shown, prior to the pouring of the concrete. The concrete strip is then poured over the joint assemblies so that the plane of the upper surface of the concrete is above the upper surface of the plastic recess forming and sealing strip, as shown most clearly in FIG. 5. Thereafter, before the concrete has set, the recess forming and sealing strip is pulled upwardly so that the upper edge thereof is positioned at the plane of the upper surface of the concrete as shown in FIG. 6, thereby forming a recess in the upper surface of the concrete in alignment with the center plate. In this position the clamping members 41 engage the upper portion of the center plate as shown. When the recess forming and sealing strip 25 is pulled upwardly to the position shown in FIG. 6, the tension exerted thereon vertically elongates and temporarily decreases the width of the strip so that the recess formed is slightly less in width than the normal relaxed width of the recess forming and sealing strip. Thus, when the sealing strip 25 is in the position shown in FIG. 6 it serves to fully seal the recess and prevent dirt and contamination from entering therein.

The recess forming and sealing strip 25 is intended, under normal circumstances, to serve only as a temporary sealing strip. In due course it is preferably removed by being pulled upwardly. Thereafter, a permanent seal may be inserted in the recess. The permanent seal may be formed in situ from pitch or composition material poured into the recess. However, it is preferably in the form of a preformed sealing strip made of neoprene or some other suitable elastomeric material which is resistant to corrosion and damage from the concrete or from hydrocarbon products, calcium chloride or other chemicals which may be deposited on the highway. One such sealing strip is shown at 43 in FIG. 7 but it should be understood that other types of preformed sealing strips may be inserted in the recess. To facilitate the insertion of the sealing strip and in order to help secure it in place, a coating of adhesive may be applied to the outer surface of the neoprene strip and to the inner surface of the recess prior to inserting the strip. Any suitable adhesive which adheres to both the neoprene of the sealing strip and to the concrete may be employed and for this purpose synthetic rubber cement serves very satisfactorily.

In FIGS. 6a and 7a modified forms of temporary seal 25a and permanent seal 43a are illustrated respectively. As will be appreciated from these views, the sides of these members are not interrupted or deformed but define relatively straight lines in section and consequently a V-shaped configuration from top to bottom. In substantially all other respects these seals 25a and 43a are identical with the previously described seals 25 and 43.

As previously indicated, the center plate forms a plane of weakness and in due course a crack forms through the concrete slab to the lower surface thereof in alignment with the center plate and recess.

Other forms of recess forming and sealing strip may be employed, as for instance, those shown in FIGS. 8 to 20, inclusive. The strips shown in these figures not only may be used to form the recesses but they may be left permanently in place to form the permanent seal in the recess on each joint. In the form shown in FIGS. 8 and 9 I have provided a pair of side supporting portions or strips 45 which are made of a relatively stiff but flexible, yielding and resilient material having sufficient stiffness, as indicated above, to maintain its general configuration when the strip is pulled upwardly through freshly poured concrete to form the recess. For this purpose the side supporting members may be made of a relatively stiff but yielding polyvinyl chloride, polyethylene or polypropylene. Each of these strips has a slight angular configuration and they are arranged in opposite relationship. The outer surfaces of the strip have overhanging projections 46 which will interlock with the freshly poured concrete. The lower portions of the strips are angled inwardly to form clamping members for engaging the center plate in the same manner as the clamping members 41 in the strip 25. The upper portion of each strip is formed in an inturned flange 47 which helps to hold the central sealing member 48 in place. The strips also have inwardly and upwardly projecting tabs 49 which engage with a central recess 50 formed in the sealing portion, also to help hold it in place. The sealing portion 48 is made of an elastomeric material which will not be adversely affected by the concrete, hydrocarbons, calcium chloride or other chemicals deposited on the concrete. For this purpose, I prefer to employ neoprene. The strip 25′ is assembled with the center plate of the joint assembly in the same manner as strip 25 by being initially pressed downwardly to its lowermost position. Then, while the concrete has been freshly poured and before it has set, it is raised upwardly so that the upper portion thereof is in the plane of the upper surface of the concrete. The freshly poured concrete interlocks with the overlapping projections 46, permanently retaining the seal in place and in sealing relationship with the recess. The resilient elastomeric insert portion 48 serves to compensate for contractions and expansions in the concrete.

Figure 9:
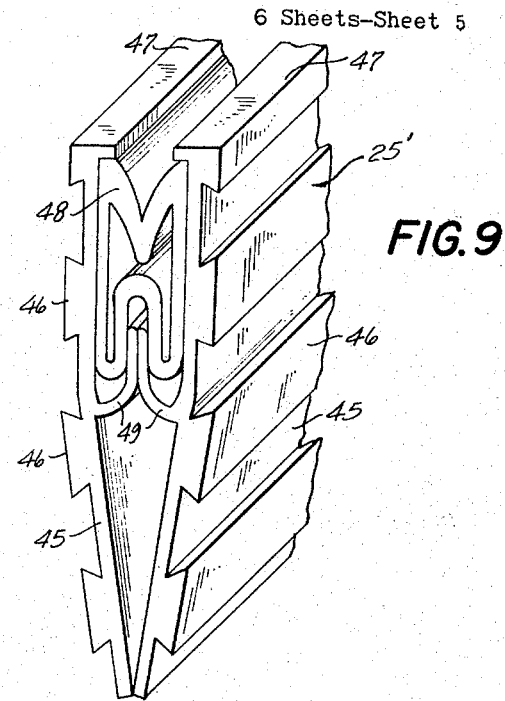
FIG. 9 is a fragmentary perspective view in elevation of the recess forming and sealing strip of FIG. 8.
Figure 10:
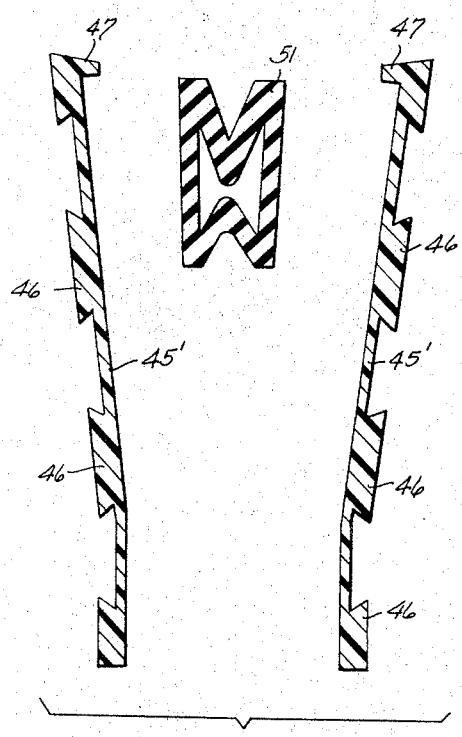
FIG. 10 is an exploded view similar to FIG. 8 showing a modified form of recess forming and sealing strip.
Figure 11:
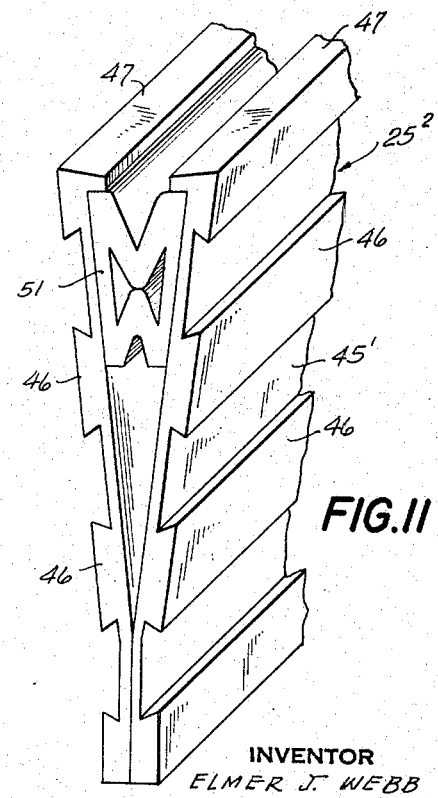
FIG. 11 is a perspective view in elevation of the recess forming and sealing strip of FIG. 10.

In FIGS. 10 and 11 I have shown a further modified form of recess forming and sealing strip which may be permanently left in place. The side members 45′ are made of the same material as the side members 45 of the device shown in FIGS. 8 and 9 and are formed with overhanging projections 46 on their outer surfaces. The side members 45′ are angled inwardly but the lower ends thereof are formed in parallel relationship and serve as clamping members to engage the center plate and hold the strip in place. A sealing member or portion 51 made if a suitable elastomeric material, such as neoprene, is adhesively secured to the inner surfaces of the side members 45′ at the upper end thereof and the flanges 47 overlap the edges of the sealing portion.

Figure 8:
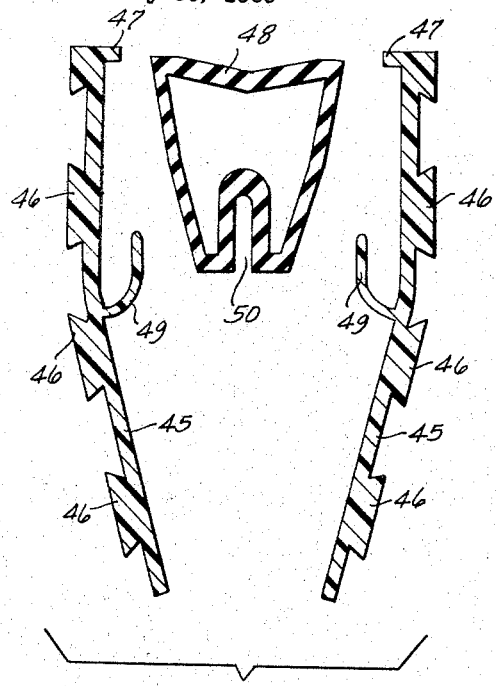
FIG. 8 is an exploded view in transverse section showing the disassembled parts of one form of recess forming and sealing strip which may serve as a permanent seal.

The recess forming and sealing strip shown in FIGS. 10 and 11 is assembled with the joint assembly in the same manner as the device shown in FIGS. 8 and 9 and after the concrete is poured, it is pulled upwardly to its elevated position to form the recess and to provide a permanent seal.

In the additional configuration shown in FIGS. 12 through 20, the side members are made of the same material as the side members 45 and may be provided with external projections or ribs having overhanging surfaces, such as shown at 46 in FIGS. 8 and 9. Similarly, the seal portion is made of an elastomeric material, such as neoprene, and may be held in place not only by the mechanical interlocks shown but also by means of a suitable adhesive such as synthetic rubber cement.

Figure 12:
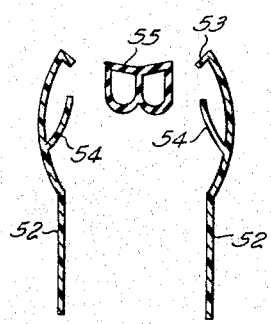
FIG. 12 is an exploded view in section of a further modified form of recess forming and sealing strip.
Figure 13:
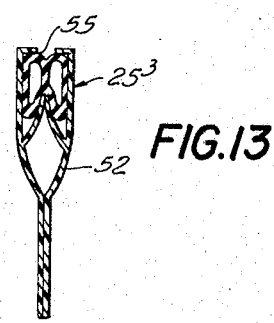
FIG. 13 is an elevational view in section of the recess forming and sealing strip of FIG. 12.
Figure 14:
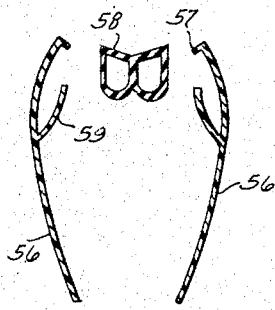
FIG. 14 is an exploded view in section of a further modified form of recess forming and sealing strip.
Figure 17:
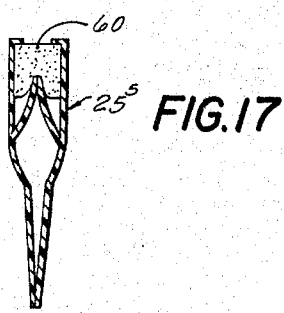
FIG. 17 is an elevational view in section of the recess forming and sealing strip of FIG. 16.

In the form of device shown in FIGS. 12 and 13 the side members are designated by the numeral 52 and they have convex outer surfaces at their upper ends and straight parallel clamping members which engage each other at their lower ends. Inturned flanges 53 are provided at their upper edges for overlapping the sealing portion or member 55. Upwardly and inwardly projecting tabs 54 engage in a central recess at the lower surface of the sealing portion. The several parts making up the strip are shown in FIG. 12 and the assembled strip is shown in FIG. 13. In the form of device shown in FIGS. 14 and 15, the relatively stiff side portions or members are shown at 56 and they present a generally convex outer surface extending from the upper edge to the lower edge thereof. The upper edge has an inwardly projecting flange portion 57 which overlaps the neoprene seal 58. Tabs 59 are provided for engaging the recess formed in the lower surface of the sealing strip. A suitable adhesive is preferably used between the sealing strip and side members. In the form of device shown in FIGS. 16 and 17 a neoprene foam sealing member or portion 60 is utilized. The side members 61 have an external convex surface at the upper portion and straight inwardly angled clamping members at the lower portion. Flanges 62 are provided at the upper ends of the side members to overlap the resilient neoprene sealing members and inwardly and upwardly projecting tabs are provided on the side members to engage and depress the central portion of the neoprene foam sealing member as shown in FIG. 17.

Figure 18:
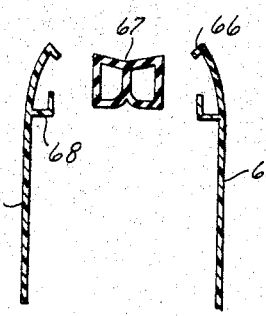
FIG. 18 is an exploded view in section of a further modified form of recess forming and sealing strip.
Figure 19:
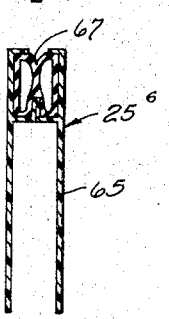
FIG. 19 is an elevational view in section of the recess forming and sealing strip of FIG. 18.

In the modifications shown in FIGS. 18 and 19 the side members 65 are relatively straight for the major portion thereof but curve inwardly adjacent their upper ends. Inwardly extending flanges 66 are provided at their upper ends for overlapping the edges of the sealing member or portion 67. Upwardly angled tabs 68 projecting inwardly from the side members engage in a central recess formed in the lower surface of the sealing member. When the device is assembled it assumes the configuration shown in FIG. 19.

Figure 15:
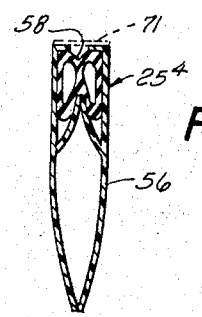
FIG. 15 is an elevational view in section of the recess forming and sealing strip of FIG. 14.
Figure 16:
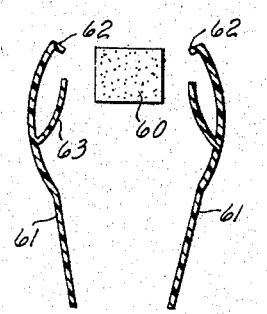
FIG. 16 is an exploded view in section of a further modified form of recess forming and sealing strip.
Figure 20:
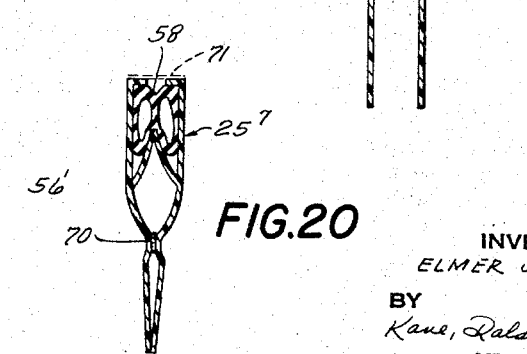
FIG. 20 is a sectional view in elevation of a further modified form of recess forming and sealing strip similar to that shown in FIG. 15 but in which the side supporting portions are secured together a spaced distance from the lower end thereof.

The assembled device shown in FIG. 20 may be similar to the assembled device shown in FIG. 15 with the exception that the side members 56′ may be secured together a spaced distance from the lower end thereof as shown at 70 by a suitable water-soluble adhesive such as a water-soluble polysaccharide adhesive. The upper portion thereof may be held in assembled relationship by means of a pressure sensitive tape 71. Thus, the device is held in assembled relationship while it is being assembled and installed. After the concrete has been poured and the strip has been elevated to the surface of the concrete, it becomes interlocked with the concrete and is firmly held in assembled relationship. The tape 71 will be removed prior to the setting of the concrete.

Any of the other forms of strips may be similarly initially held in assembled relationship by means of pressure sensitive tape 71, as indicated in the form of device shown in FIG. 15.

In each of the forms of recess forming and sealing strips shown in FIGS. 8 through 20 it will be appreciated that I have provided a strip which may be utilized to form the recess in the freshly poured concrete and which thereafter becomes interlocked with the concrete so as to form a permanent seal preventing foreign material and contaminants from entering into the recess and joint. It will thus be seen that I have provided an improved transverse joint assembly for concrete pavements and an improved method of making the same, whereby the recess may be formed and sealed in a manner to minimize contamination and the accumulation of foreign matter and dirt in the recess, and so as to assure sealing of the recess against leakage; which provides for contraction and expansion while preventing or minimizing excessive and harmful flexing or vertical shifting of the ends of the slabs; and which, while vertically stabilizing the ends of the slabs, avoids excessive external stresses in the concrete.

Modifications may be made in the illustrated and described embodiments of my invention without departing from the invention as set forth in the accompanying claims.

I claim:
1. A load supporting assembly for use in a transverse concrete joint assembly for transferring the load between the ends of two adjacent concrete pavement sections separated by a crack or recess comprising a pair of load supporting arms each having a first load transferring end of relatively greater cross section and tapering in cross section to a second end of relatively smaller cross section and cooperable to be embedded in the ends of two adjacent concrete pavement sections in alignment with each other and parallel to the longitudinal axes of the pavement sections with the first ends in engagement with each other and the second ends curved downwardly for supporting engagement with the ground, said first ends having complementary fastenings in the form of a sleeve on one support which is split and having a portion which can be shifted inwardly and outwardly to adjust the tightness of the fit and a lug on the other support having telescopic engagement with each other to provide for relative longitudinal adjustment and shifting while limiting relative transverse movement, an elongated center plate cooperable to be arranged in a vertical plane between the ends of the respective ends of adjacent concrete pavement sections and having a plurality of apertures extending therethrough of relatively greater size than the size of said other support arm yet of a size smaller than the size of said one support arm so that said center plate is supportingly receivable on the telescopically joined arms to a position at the connection whereat the center plate abuts the sleeve end surface, tab means on said center plate at said apertures capable of pivotal movement thereby to reduce the size of aperture openings and releasably secure substantially without vertical movement the center plate to said load supporting arms.

2. The load supporting assembly of claim 1 including a pair of spacer bars in engagement with the first ends of said supports to maintain them in fixed spaced relationship with other similar supports.

3. The load supporting assembly as set forth in claim 1 in which some of the pairs of supports are arranged in opposite relationship to other of the pairs of supports so that some of the sleeves face in one direction while the other sleeves face in the opposite direction.

4. The load supporting assembly of claim 1 comprising a recess forming and sealing strip in the form of an elongated upwardly projecting cap portion extending the entire length of the strip and a downwardly extending guide means having sliding engagement with the center plate so that it can be shifted from a lowered position whereby the concrete can be poured over the top thereof and movable to and retained in situ in an elevated position at the concrete surface thereby forming a joint recess in the freshly poured concrete and serving as a permanent seal and closure for the recess thus formed.

5. The load supporting assembly as set forth in claim 4 in which the cap portion has a pair of side members of sufficient strength and rigidity so that the sealing strip can be pulled upwardly through freshly poured concrete to form a recess and having an intermediate yielding and elastomeric portion extending for the entire length of the strip so that the strip can expand and contract while maintaining its sealing relationship.

6. An improved transverse concrete joint assembly for use in transferring the load between the ends of two adjacent concrete pavement sections separated by a transverse expansion-contraction joint comprising an elongated center plate having means for maintaining the plate in a vertical plane between the respective ends of adjacent concrete pavement sections, and means for forming said expansion-contraction joint and permanently sealing the same, said forming and sealing means defined by an elongated strip member having an upwardly projecting cap portion and side walls of sufficient strength and rigidity to be pulled through freshly poured cement extending the entire length of the strip and a downwardly extending guide means having a pair of parallel mounting members for engagement with the opposite sides of the center plate, said strip being initially in a lower position supported by the center plate whereby concrete can be poured over the top thereof and then movable upwardly from the lower position through the freshly poured concrete to form the expansion-contraction joint, and an intermediate yielding and elastomeric element supported within the strip and extending for the entire length of the strip whereby the strip when raised to the concrete surface remains in situ to provide by expansion and contraction of the walls and elastomeric element a permanent seal and closure for the joint.

References Cited

UNITED STATES PATENTS

| | | | |
|---|---|---|---|
| 1,885,391 | 11/1932 | Thompson et al. | 94—18.2 |
| 2,319,713 | 5/1943 | Williams | 94—18 |
| 2,949,828 | 8/1960 | Carnes | 94—17 X |
| 3,089,395 | 5/1963 | Crone | 94—17 |
| 3,217,614 | 11/1965 | Crone | 94—8 |
| 3,256,786 | 6/1966 | Middlestadt | 94—18 |
| 3,257,916 | 6/1966 | Dickow et al. | 94—22 X |

JACOB L. NACKENOFF, *Primary Examiner.*